(12) United States Patent
Mermelstein et al.

(10) Patent No.: US 12,553,141 B2
(45) Date of Patent: Feb. 17, 2026

(54) ISOLATION AND SERVICEABILITY OF INDEPENDENT GENERATOR MODULE PRODUCT LINES IN AN ELECTROLYSIS STAMP

(71) Applicant: Bloom Energy Corporation, San Jose, CA (US)

(72) Inventors: Joshua Mermelstein, San Jose, CA (US); Ryan Johnson, San Jose, CA (US); Jessica Mahler, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/181,888

(22) Filed: Mar. 10, 2023

(65) Prior Publication Data

US 2023/0287589 A1   Sep. 14, 2023

Related U.S. Application Data

(60) Provisional application No. 63/318,695, filed on Mar. 10, 2022.

(51) Int. Cl.
C25B 15/08     (2006.01)
C25B 1/04      (2021.01)
C25B 9/60      (2021.01)

(52) U.S. Cl.
CPC .............. *C25B 15/083* (2021.01); *C25B 1/04* (2013.01); *C25B 9/60* (2021.01)

(58) Field of Classification Search
None
See application file for complete search history.

(56) References Cited

U.S. PATENT DOCUMENTS

| 8,822,101 | B2 | 9/2014 | Richards et al. | |
|---|---|---|---|---|
| 11,205,794 | B2 | 12/2021 | Trevisan et al. | |
| 2004/0224193 | A1* | 11/2004 | Mitlitsky | H01M 8/04992 429/495 |
| 2016/0006057 | A1* | 1/2016 | Nakamoto | H01M 8/04303 429/444 |
| 2016/0377342 | A1 | 12/2016 | Mermelstein | |
| 2017/0005357 | A1* | 1/2017 | Mermelstein | H01M 8/186 |

(Continued)

FOREIGN PATENT DOCUMENTS

JP     2007250218 A  *  9/2007  .......... H01M 85/040

OTHER PUBLICATIONS

A. Brisse et al., "Solid Oxide Electrolyzer System Operational at the H2 Refueling Station of Karlsruhe", Fuel Cells, Wiley—V C H Verlag GMBH & Co. KGAA, DE, vol. 19, No. 4, Jul. 18, 2019, pp. 408-416, XP072359513, ISSN: 1615-6846, DOI: 10.1002/FUCE. 201800163.

(Continued)

*Primary Examiner* — Louis J Rufo
(74) *Attorney, Agent, or Firm* — THE MARBURY LAW

(57) ABSTRACT

An electrolyzer system including a compressor manifold that supplies hydrogen to a gas distribution module, one or more generator modules that receives hydrogen from the gas distribution module and outputs a product gas, wherein each of the generator modules supplies product gas to a product manifold during normal operation or to a vent manifold in the event of a fault.

12 Claims, 6 Drawing Sheets

(56) References Cited

U.S. PATENT DOCUMENTS

2017/0062848 A1* 3/2017 Mermelstein ......... H01M 8/186
2018/0026290 A1 1/2018 Mermelstein et al.

OTHER PUBLICATIONS

J.E. O'Brien et al., "High Temperature Electrolysis Pressurized Experiment Design, Operation, and Results", Sep. 13, 2012 (Sep. 13, 2012), XP055260106, Idaho Falls, Idaho 83415, USA retrieved from the Internet: URL:https://inldigitallibrary.inl.gov/sti/5516323.pdf [retrieved on Mar. 21, 2016], 29 pages.
J.E. O'Brien et al., "A 25 KW high temperature electrolysis facility for flexible hydrogen production and system integration studies", International Journal of Hydrogen Energy, Elsevier, Amsterdam, NL, vol. 45, No. 32, May 11, 2020 (May 11, 2020), pp. 15796-15804, XP086164464, ISSN: 0360-3199, DOI: 10.1016/J.JHYDENE.2020.04.074 [retrieved on May 11, 2020].
Search Report issued Aug. 11, 2023 in corresponding European Patent Application No. 23161157.5.

\* cited by examiner

200

300

400

500

ISOLATION AND SERVICEABILITY OF INDEPENDENT GENERATOR MODULE PRODUCT LINES IN AN ELECTROLYSIS STAMP

PRIORITY INFORMATION

This application claims the benefit of U.S. Provisional Patent Application No. 63/318,695 filed on Mar. 10, 2022, which is hereby incorporated by reference in its entirety.

FIELD OF THE INVENTION

The embodiments of the present invention are generally directed toward electrolyzer systems including solid oxide electrolyzer cells (SOEC) and methods of operating the same. In particular, toward to isolation and serviceability of independent generator module steam lines in an electrolysis stamp.

BACKGROUND

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) can be referred to as the air electrode, and the SOFC anode (SOEC cathode) can be referred to as the fuel electrode. During SOEC mode, water in the fuel stream is reduced ($H_2O + 2e^- \rightarrow O^{2-} + H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY OF THE INVENTION

Accordingly, the embodiments of the present invention are directed to isolation and serviceability of independent SGM steam lines in an electrolysis stamp that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the isolation and serviceability of independent generator module steam lines in an electrolysis stamp includes systems, devices, methods, and instructions that operated an electrolyzer system including a compressor manifold that supplies hydrogen to a gas distribution module, one or more generator modules that receives hydrogen from the gas distribution module and outputs a product gas, wherein each of the generator modules supplies product gas to a product manifold during normal operation or to a vent manifold in the event of a fault.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the embodiments of the present invention, examples of which are illustrated in the accompanying drawings. It is to be understood that both the foregoing general description and the following detailed description are examples, and are not restrictive of the invention as claimed.

The embodiments of the present invention generally relate to serviceability and maintenance of individual generator modules, isolation and control of steam supply to individual generator modules, and isolation and control of steam to a stamp manifold. In addition, the embodiments of the present invention provide protection for the generator modules from over pressurization that can occur as a result of upstream and downstream system faults.

Figure 1:
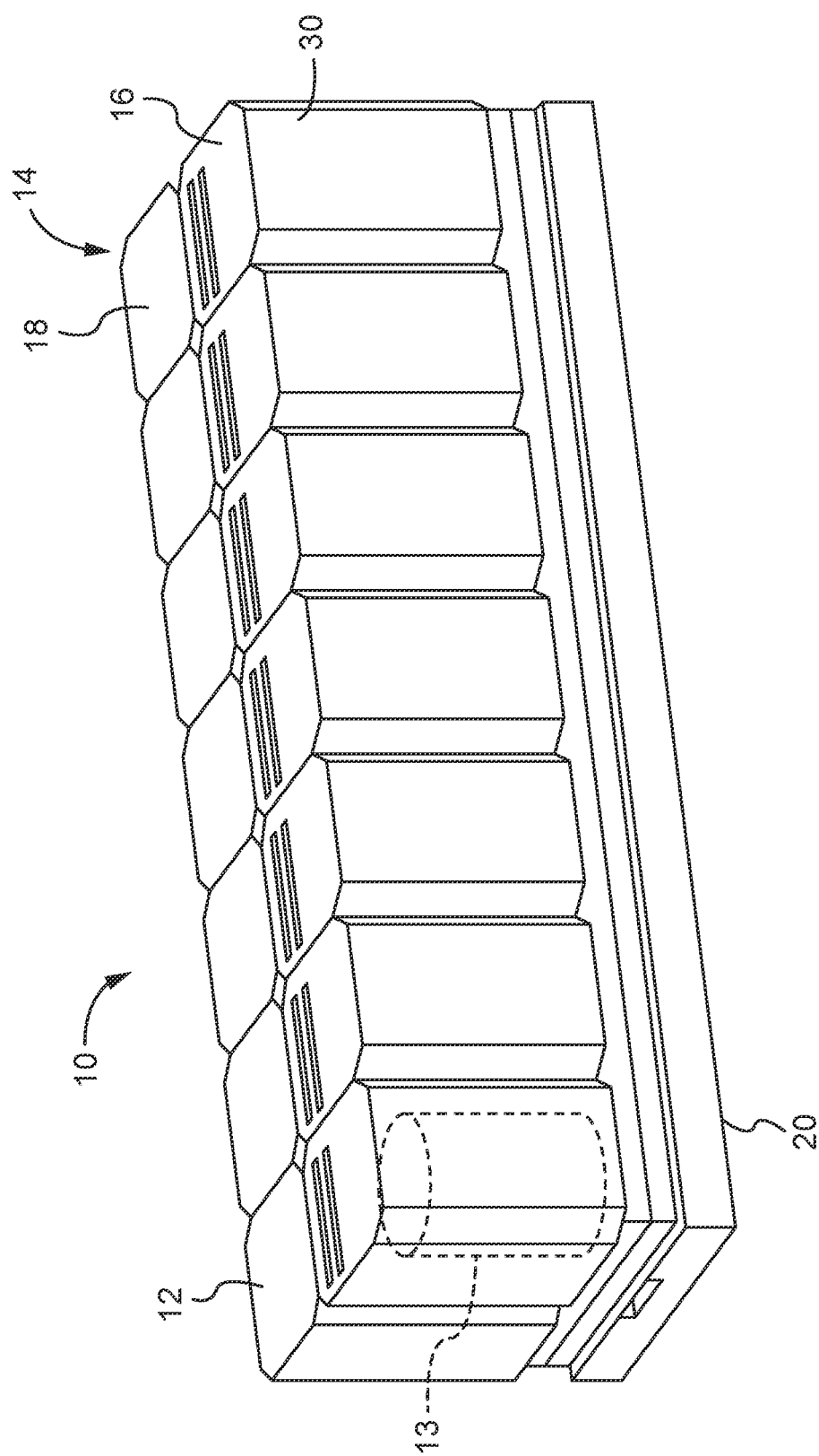
FIG. 1 illustrates a SOFC/SOEC modular system according to an example embodiment of the present invention.

FIG. 1 illustrates a SOFC/SOEC modular system 10 according to an example embodiment of the present invention.

The modular design of the SOFC/SOEC system 10 provides flexible system installation and operation. Modules enable scaling of installed generating capacity, reliable generation of power, flexibility of fuel processing, and flexibility of power output voltages and frequencies with a single design set. The modular design results in an "always on" unit with very high availability and reliability, and also provides an improved means of maintenance and scale-up. The modular design also enables the use of available fuels and required voltages and frequencies that can vary by customer and/or by geographic region.

The SOFC/SOEC modular system 10 includes a housing 14 in which at least one of generator modules 12 (preferably a plurality, generator module 12 also referred to as "SGM"), one or more fuel processing modules 16 (in SOFC systems), and one or more power conditioning modules 18 (i.e., electrical output, also referred to a generator module or "SPM") are disposed. In these example embodiments, the power conditioning modules 18 can include a mechanism to convert DC to AC or AC to DC. For example, the system 10 can include any desired number of modules, such as 2-30 generator modules, 3-12 generator modules, 6-12 modules, or other large site configuration of generator modules.

The example system 10 of FIG. 1 includes any number of generator modules 12 (one row of six modules stacked side to side), one fuel processing module 16 (in SOFC systems), and one power conditioning module 18 on a pad 20. The housing 14 can include a cabinet to house each module 12, 16, 18. Alternatively, modules 16 and 18 can be disposed in a single cabinet. While one row of generator modules 12 is shown, the system can include more than one row of modules 12. For example, the SOFC/SOEC system 10 can include two rows of generator modules 12 arranged back-to-back or end-to-end.

Each generator module 12 is configured to house one or more hotboxes 13. Each hotbox contains one or more stacks or columns of fuel/electrolyzer cells (not shown for clarity), such as one or more stacks or columns of solid oxide fuel cells having a ceramic oxide electrolyte separated by conductive interconnect plates. Other fuel cell types, such as polymer electrolyte membrane (PEM), molten carbonate, phosphoric acid, etc. also can be used.

The fuel cell stacks can include externally and/or internally manifolded stacks. For example, the stacks can be internally manifolded for fuel and air with fuel and air risers extending through openings in the fuel cell layers and/or in the interconnect plates between the fuel cells.

The fuel cell stacks can be internally manifolded for fuel and externally manifolded for air, where only the fuel inlet and exhaust risers extend through openings in the fuel cell layers and/or in the interconnect plates between the fuel cells. The fuel cells can have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processing module 16 and the power conditioning module 18 can be housed in one cabinet of the housing 14. As shown in the example embodiment in FIG. 1, one cabinet 14 is provided for one row of six (or any number of) generator modules 12, which are arranged linearly side-to-side on one side of the input/output module 14. The row of modules can be positioned, for example, adjacent to a building for which the system provides power (e.g., with the backs of the cabinets of the modules facing the building wall).

The linear array of generator modules 12 is readily scaled. For example, more or fewer generator modules 12 can be provided depending on the power needs of the building or other facility serviced by the fuel cell/electrolyzer system 10. The generator modules 12 and input/output modules 14 can also be provided in other ratios. For example, in other exemplary embodiments, more or fewer generator modules 12 can be provided adjacent to the input/output module 14. Further, the support functions could be served by more than one input/output module 14 (e.g., with a separate fuel processing module 16 and power conditioning module 18 cabinets). Additionally, the input/output module 14 is at the end of the row of generator modules 12, it also can be located in the center of a row generator modules 12 or other location.

The SOFC/SOEC modular system 10 can be configured in a way to ease servicing of the components of the system 10. For example, the routinely or high serviced components (such as the consumable components) can be placed in a single module to reduce amount of time required for the service person. For example, a purge gas (optional) can be placed in a single module (e.g., a fuel processing module 16 or a combined input/output module 14 cabinet). This can be the only module cabinet accessed during routine maintenance. Thus, each module 12, 14, 16, and 18 can be serviced, repaired or removed from the system without opening the other module cabinets and without servicing, repairing or removing the other modules. In addition, plumbing and electrical components can be disposed above a steel overlay disposed between the concrete pad and the generator modules 12.

For example, as described above, the system 10 can include multiple generator modules 12. When at least one generator module 12 is taken off line (i.e., no power is generated by the stacks in the hotbox 13 in the off line module 12), the remaining generator modules 12, the fuel processing module 16 and the power conditioning module 18 (or the combined input/output module 14) are not taken off line. Furthermore, the fuel cell/electrolyzer system 10 can contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 can be electrically disconnected, removed from the fuel/electrolzer cell modular system 10 and/or serviced or repaired without stopping an operation of the other modules in the system, allowing the fuel cell system to continue to generate electricity. The entire SOFC/SOEC modular system 10 does not have to be shut down if one stack of fuel cells/electrolyzers in one hot box 13 malfunctions or is taken off line for servicing.

Figure 2:
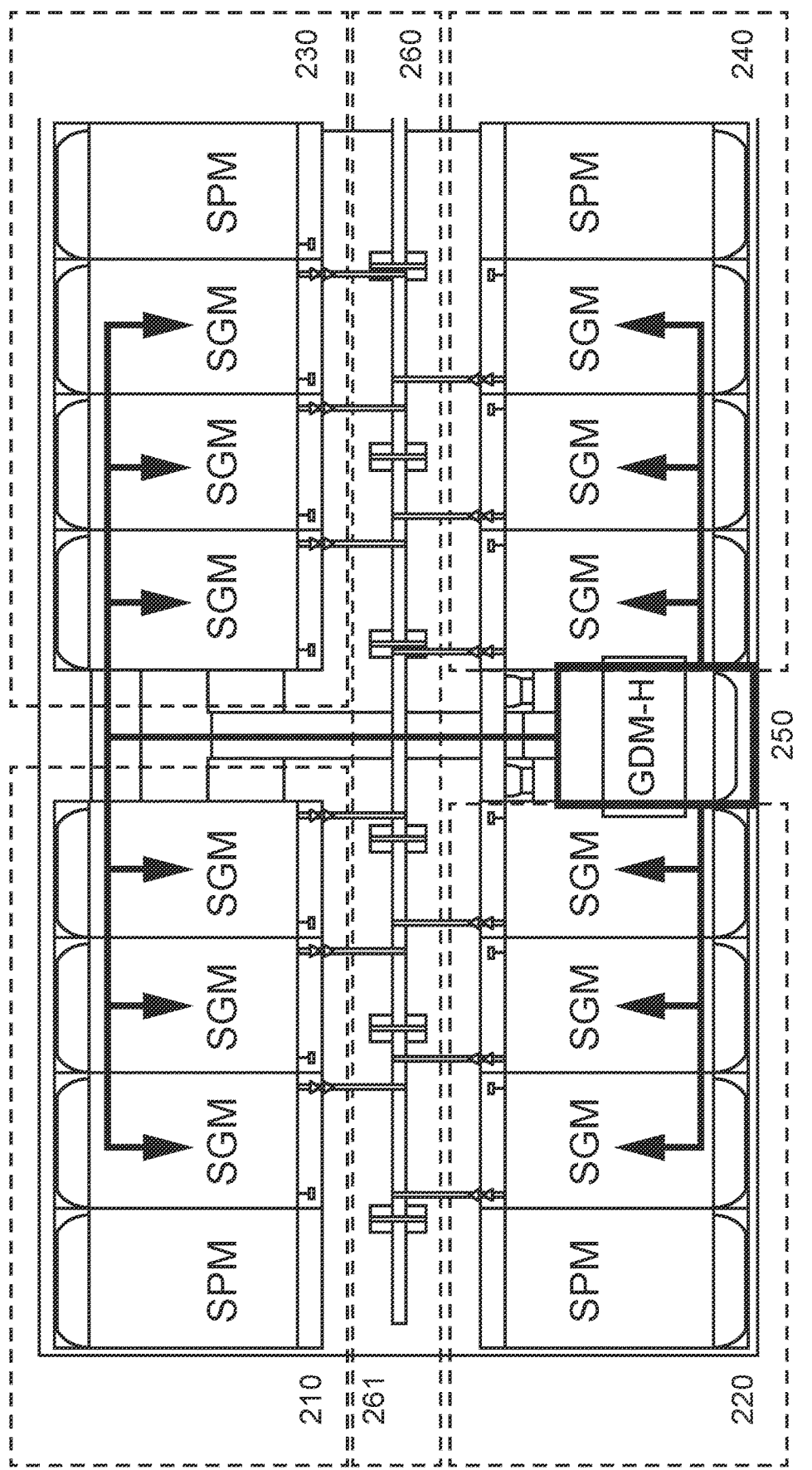
FIG. 2 illustrates a large site electrolyzer system according to an example embodiment of the present invention.

FIG. 2 illustrates a large site electrolyzer system 200 according to an example embodiment of the present invention.

The large-site electrolyzer system 200 includes a gas distribution module ("GDM") 250 that is configured to supply a plurality of modular blocks 210, 220, 230, 240 with start-up hydrogen. SOEC and SOFC systems generally require fresh hydrogen gas for start-up and shutdown. Gas distribution module 250 can further include a pressure detector, thermal detector, a gas safety shutoff, and a purge gas distributor.

As discussed above, each modular block incudes one power module ("SPM") and one or more generator modules ("SGM"), for example. A grouping of modular blocks into a collection of systems is referred to as a stamp. Thus, large site electrolyzer system 200 is a stamp. Because hydrogen is a flammable gas that is supplied to each SGM at pressure, a safe method of shutting off gas to a group of generator modules SGMs is needed if a safety event is detected. Thus, GDM 250 is configured to shut off hydrogen supplied to SGMs in the event that a safety event is detected. Safety designs, such as pressure detection, overpressure protection, and gas safety shutoff are readily applied within electrolyzer system 200 by GDM 250 and/or the fuel processing module (e.g., 16). In addition, a stamp level controller can be provided at GDM 250.

Although the grouping of four modular blocks 210, 220, 230, 240 is an example configuration, this configuration is an efficient grouping for gas safety. In addition, the grouping of four modular blocks 210, 220, 230, 240 is efficient for the collection of hydrogen product within servicing aisle 260. Numerous other configurations are feasible. The piping 261 within servicing aisle 260 is configured to collect hydrogen product for integration with a downstream compression system. Piping 261 is configured to prevent condensate backflow into the generator modules SGMs. Condensate management also enables using various monitoring and control devices as well as piping to return to the water outlet (or BOP1).

Figure 3:
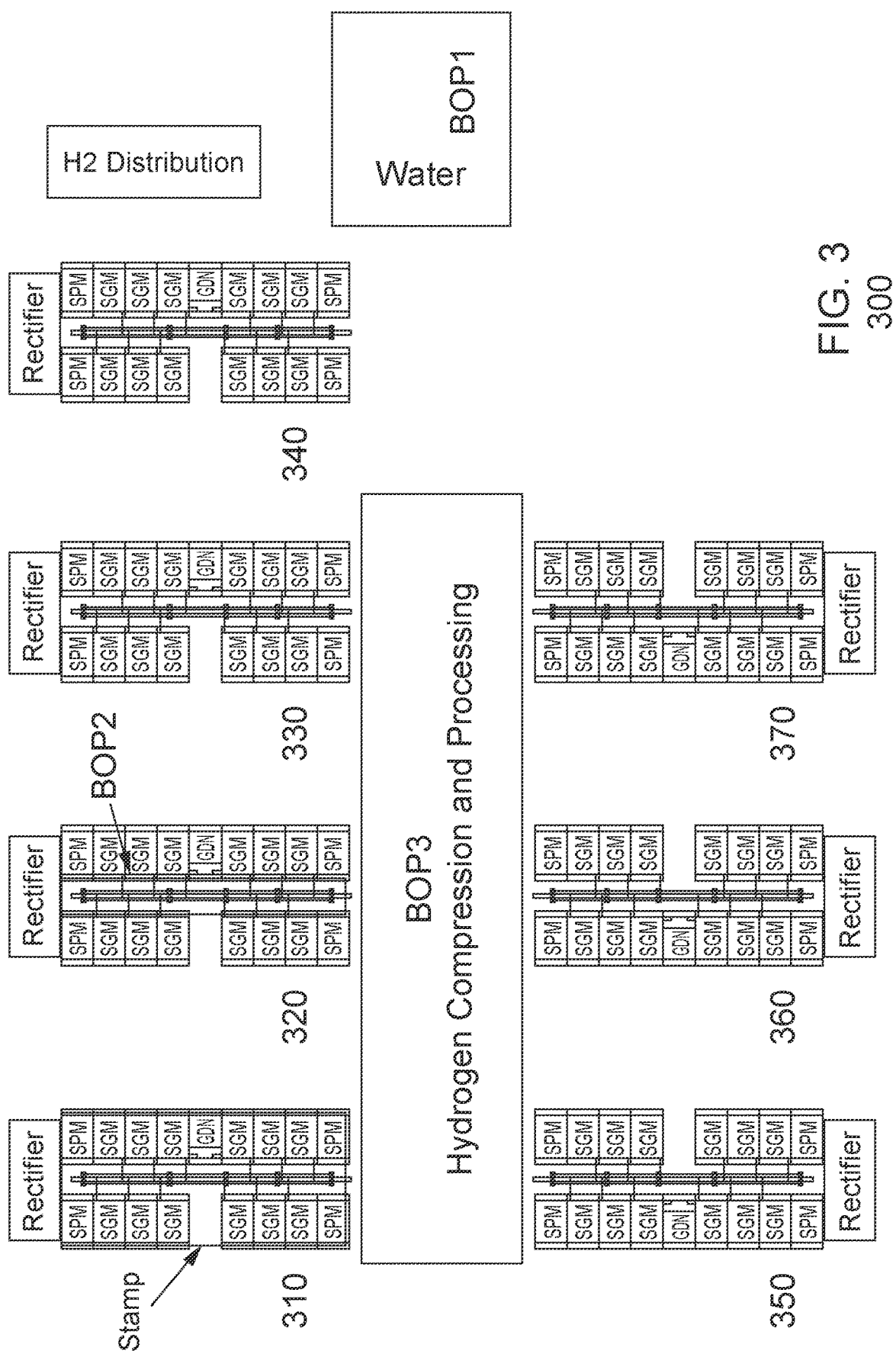
FIG. 3 illustrates a large site electrolyzer system according to another example embodiment of the present invention.

FIG. 3 illustrates a large site (e.g., a 10-megawatt system) electrolyzer system 300 according to an example embodiment of the present invention. As illustrated in FIG. 3, electrolyzer system 300 includes a plurality of stamps 310, 320, 330, 340, 350, 360, and 370. In addition, electrolyzer system 300 further includes additional balance of plant components, such as water source BOP1, hydrogen product collectors BOP2 (e.g., including piping 261), and hydrogen compression and processing BOP3. Hydrogen compression and processing BOP3 is functionally configured to supply hydrogen at pressure to the gas distribution module (e.g., GDM 250) of each respective stamp 310, 320, 330, 340, 350, 360, and 370 as well as to the downstream customer.

The stamp architecture can be repeated in a large site layout, using the repeated elements to build up to a large site installation. In the various embodiments, modularity and scalability of the components of electrolyzer system 300 such as hydrogen product collectors BOP2 (e.g., including piping 261 and other SGM interconnecting piping), is provided. In addition, scalability and modularity of hydrogen compression and processing BOP3 (e.g., including the compressor skid), is provided. Scalability and modularity of the hydrogen product collectors BOP2 and the hydrogen compression and processing BOP3 for hydrogen compression is configured to enable the needs of a variable number of stamps, stamp size, and n+1 compressors for multiple size systems.

The embodiments of the present invention enable flexibility of balance of plant design to accommodate modular stamps in skid format and flexibility for the number of processing units at a stamp (e.g., a 10 MW system or a greater than 10 MW system). In addition, the embodiments of the present invention enable scale up or scale down of compression and the number of compressors (e.g., compressor 422) to address cost and customer requirements.

The design of the hydrogen product collectors BOP2 includes a manifolded system that is varied based the number of and configuration of generator modules in a respective stamp. In the various configurations, the manifold can be shortened or lengthened based on the number of generator modules in the respective stamp. As an example, a 16 generator module stamp can have 2 rows of 8 generator modules. In this example, two separate manifolding systems can be combined downstream into one manifold to feed a single compressor. Numerous other configuration are feasible.

Similarly, the hydrogen compression and processing BOP3 and the various other components have a scale up design that can be used for a single generator module up to a 10 MW or greater than a 10 MW system. The design can be limited by the manufacturing capacity size of a compressor, and multiple compressors can be used.

The hydrogen compression and processing BOP3 uses a recycle system based on pressure control that ultimately sets the back pressure for the generator modules. Unlike traditional PEM or other SOEC manufacturers, the generator modules of the embodiments do not need to be placed within a container. The manifolding behind the generator modules for process gases is compact enough to enable a containerized solution, outdoor installation, or covered industrial building installation.

Figure 4:
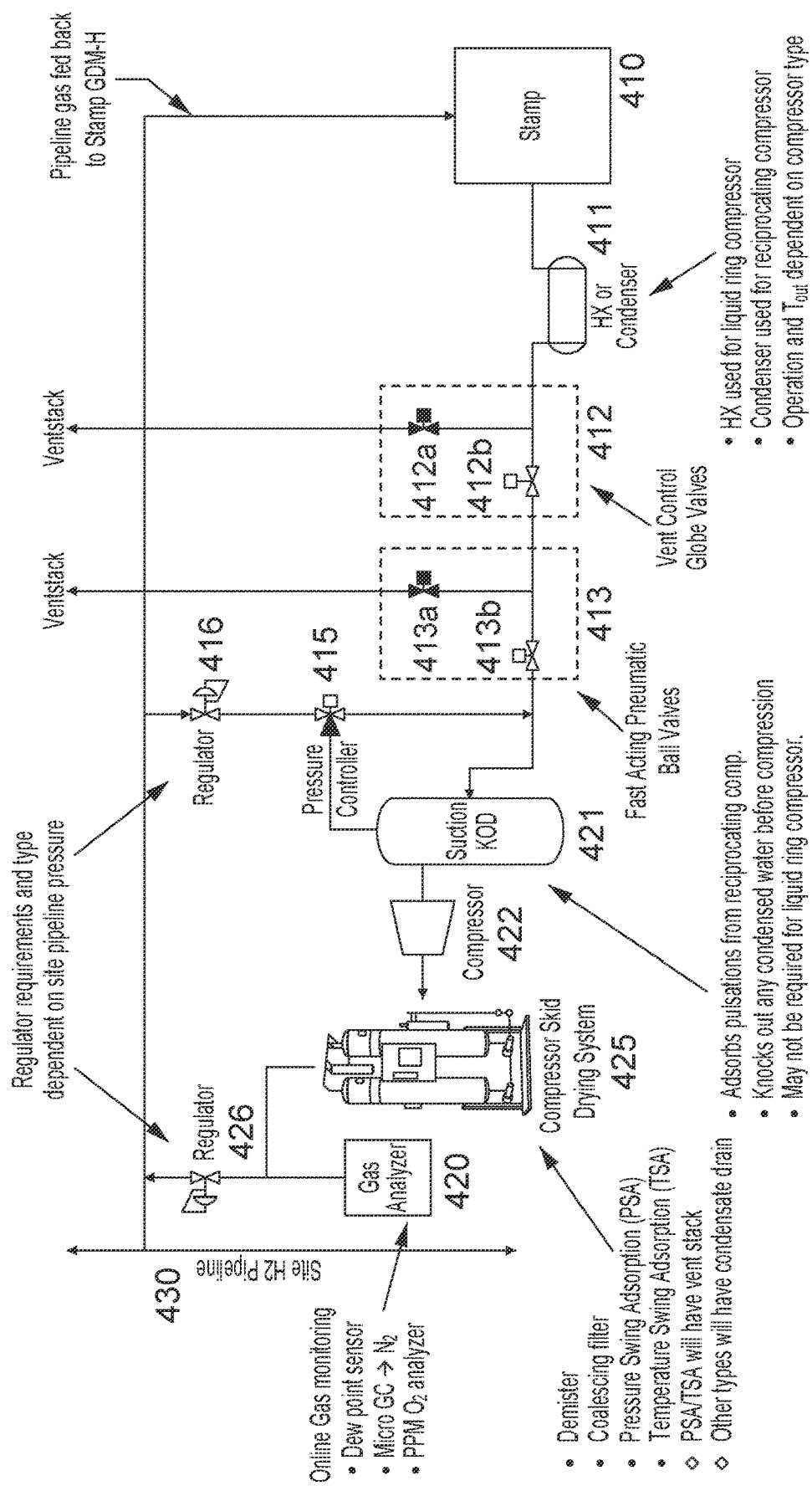
FIG. 4 illustrates a compressor system according to an example embodiment of the present invention.

FIG. 4 illustrates a compressor system 400 according to an example embodiment of the present invention.

As illustrated in FIG. 4, compressor system 400 includes one or more stamps 410 being supplied with hydrogen by manifold 430 (e.g., a product manifold for a site, or coupled to stored hydrogen). For example, the hydrogen can be supplied to a gas distribution module (e.g., GDM 250 of FIG. 2) of the one or more stamps 410. Compressor system 400 further includes a closed feedback loop from the one or more stamps 410 through heat exchanger or condenser 411, transition valves 412, isolation valves 413, suction knockout drum 421, compressor 422, compressor skid drying system 425 (e.g., dryer), and gas analyzer 420. In the various configurations, there may be one compressor 422 per stamp, or one compressor 422 for multiple stamps 410.

One or more stamps 410 supply wet hydrogen (e.g., a combination of steam and hydrogen) to heat exchanger or condenser 411. Heat exchanger or condenser 411 reduces the temperature of the output of the one or more stamps 410 to a temperature suitable for the suction of compressor 422 (e.g., cools by between 40° C. and 80° C. such that 150° C. at stamp output is cooled to between 70° C. and 110° C.). In some cases, product temperature supplied to compressor 422 can be as high as 230° C. Thus, the heat exchanger or condenser 412 decreases the temperature of the wet hydrogen and also can remove at least some of the saturated water vapor in the wet hydrogen.

Transition valves 412 are used to bring one or more stamps 410 and compressor 422 to full operation. Before compressor 422 is fully operational and while one or more stamps 410 is fully operational, the output of condenser 411 is vented by opening transition valve 412A. Once compressor 422 becomes fully operational, at 100% recycle, the output of condenser 411 supplied to suction knockout drum 421 by opening transition valve 412B and closing transition valve 412A.

Isolation valves 413 (e.g., fast acting pneumatic ball valves) are used if a fault event occurs (e.g., excess pressure is detected). For example, isolation valve 413A can be opened if excess pressure is detected. Isolation valve 413B is opened during operation of compressor 422. Accordingly, excess pressure does not feedback to the one or more stamps 410 which can be damaged due to excess pressure build up.

Suction knockout drum 421, is configured to collect and discard any condensate that has formed via a condensate discharge line (not shown). Suction knockout drum 421 also is configured to regulate any pressure fluctuations.

The compressed (i.e., having increased pressure) output of compressor 422 is further dried by compressor skid drying system 425. Gas analyzer 420 monitors and controls output (i.e., the dried gas) of compressor skid drying system 425 to maintain a target dew point, target nitrogen content, and/or target oxygen content. For example, gas analyzer 420 can be configured to include a dew point sensor and one or more gas chromatographs. Gas analyzer 420 ensures that output (i.e., the dried gas) of compressor skid drying system 425 meets one or more purity requirements (e.g., moisture and gas content) before being supplied to manifold 430 (e.g., customer product line). Gas analyzer 420 can adjust the dew point (i.e., moisture) by controlling compressor skid drying system 425. However, if one or more impurities (e.g., nitrogen or oxygen) exceed respective thresholds, a warning signal or shutdown signal can be sent to a system controller (not shown).

Regulator 426 is a back pressure regulator. When system 400 is started, a minimum pressure is needed against the compressor 422 and compressor skid drying system 425. Otherwise, compressor 422 and compressor skid drying system 425 may be slow to generate sufficient pressure for operation. Regulator 416 is a forward pressure regulator. At regulator 416, compressed product can have a wide range of pressure between (e.g., 5 PSI and 10,000 PSI). Before being supplied to pressure controller 415, pressure output from regulator 416 is adjusted (e.g., to less than 100 mbar). Pressure controller 415 is configured to maintain pressure at suction knockout drum 421 by measuring pressure at suction knockout drum 421 and maintaining pressure at the feed to suction knockout drum 421 at (e.g., less than 100 mbar). In some embodiments, suction knockout drum 421 is optional.

Accordingly, the various embodiments of the present invention are directed toward integration and controls startup of a compressor system with a SOEC system generating hydrogen.

In operation, operating SOEC systems produce hydrogen at very low pressures, such as at atmospheric pressure or at just above ambient conditions (e.g., approximately 40 mbar). Due to the low pressure, minor fluctuations in downstream processing, such as turning on a compressor or switching valves, can cause an immediate pressure/vacuum surge that risks failure to the SOEC stacks. Accordingly, the various embodiments provide techniques that enable a compressor to turn on without creating such a surge, enable a smooth transition to the compressor, and provide a safe means of transitioning from compression to vent under shutdown conditions.

Others have used a pressure switch to activate turning on the compressor. Here, product hydrogen is supplied to the compressor suction. When a pressure threshold is met, the compressor turns on. This has been used in low temperature PEM and alkaline systems that have fast response from cold start conditions and can react quickly to pressure fluctuations from starting a compressor. SOEC systems generally are slower, and the embodiments utilize unreacted steam at start-up to prevent a pressure spike or vacuum at the compressor.

Others have used large inverted buckets as a means to balance pressure with the above pressure switch concept. This introduces a potential for an open system where hydrogen and air could mix. The inverted bucket also is very large and would take up considerable foot print.

In the various embodiments, the drawbacks of known techniques are solved. First, implementing a 100% recycle flow at compressor 422 where suction is controlled by pressure controller 415. Pressure controller 415 maintains a set suction pressure to compressor 422 independent of the electrolysis hydrogen flow rate. Second, implementing transition valves 412 (e.g., a feed and vent globe control valve) upstream of compressor 422 that enables a smooth transition of electrolysis product gas to compressor 422. Third, utilizing isolation valves 413 (e.g., fast acting ball valves) on the compressor skid to (immediately, e.g., within less than two or three seconds) relieve suction line pressure when compressor 422 is shut down or a fault event occurs.

The embodiments are different than known techniques by enabling the SOEC system to stabilize before turning on the compressor. In addition, stack sensitivity issues to pressure surges that could occur from the compressor unit starting up or shutting down are prevented.

Figure 5:
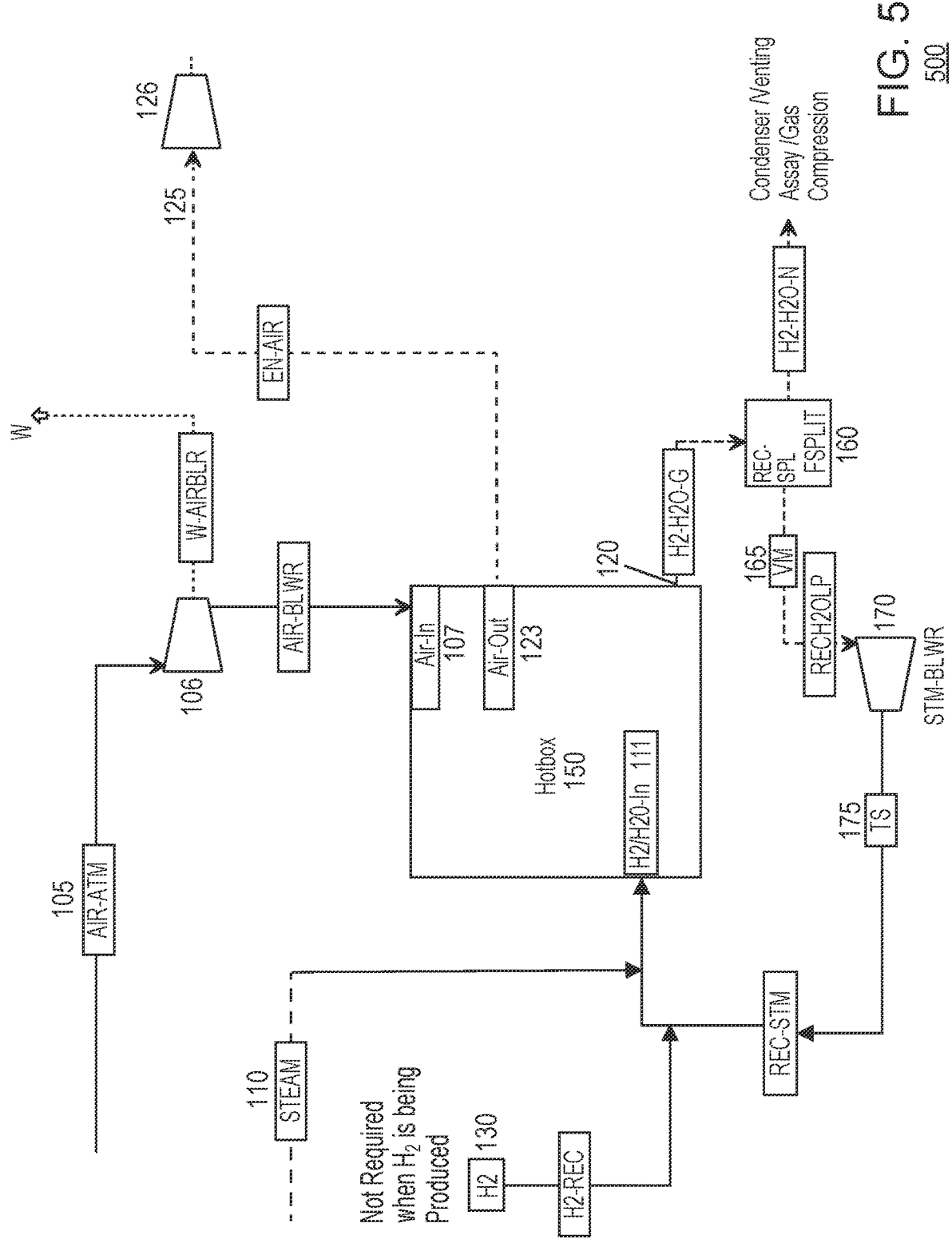
FIG. 5 illustrates an SOEC system according to an example embodiment of the present invention.

FIG. 5 is an SOEC system 500 according to an example embodiment of the present invention.

As illustrated in FIG. 5, SOEC system 100 includes air conduit 105, air blower 106, air inlet 107, steam conduit 110, recycle steam inlet 111, hotbox 150, optional hydrogen conduit 130, enriched air outlet 123, enriched air conduit 125, enriched air blower 126, steam and hydrogen product outlet 120, splitter 160, Venturi flow meter 165, steam recycle blower 170, and thermal sensor 175.

According to an example configuration and operation, steam input at steam conduit 110 (e.g., supplying site or facility steam at varying pressures) can have a temperature of between about 100° C. and 110° C. (e.g., 105° C.) and a pressure of about 1 psig. In the various embodiments, steam can be input to the SOEC system 500 from an external source or can be generated locally. In some embodiments, multiple steam inlets can be configured to receive external and local steam, respectively. Alternatively, or additionally, water can be input to the SOEC system 500 and vaporized.

Air input (e.g., ambient air) at air conduit 105 can be ambient temperature, perhaps between about −20° C. and +45° C., at the local atmospheric pressure. Air from air conduit 105 is received at air blower 106, and air output by air blower 106 will be a slightly higher temperature than ambient due to the heat of compression. For example, the temperature of air output by air blower 106 can be about 30° C. at 1.0 psig as compared to 20° C. ambient air temperature. Air input of air conduit 105 is then received at air inlet 107 of hotbox 150.

Hydrogen from optional hydrogen conduit 130 can only be required for startup and transients when hydrogen is not being otherwise produced by SOEC system 500. For example, there is no longer a need for a separate hydrogen feed stream or hydrogen recycle steam at steady state. Pressure for this hydrogen stream is a design option determined at the time of site construction, and can be between about 5 psig and 3000 psig. The temperature is likely to be near ambient, as it is likely to be coming from storage.

Air input at air conduit 105, steam input at steam conduit 110, and hydrogen input at optional hydrogen conduit 130 are input to hotbox 150. In turn, hotbox 150 outputs steam and hydrogen product $H_2$-$H_2O$-G at steam and hydrogen product outlet 120 of hotbox 150, where G stands for Gross. Hotbox output $H_2$-$H_2O$-G can have a temperature between about 500° C. and 180° C. (e.g., 130° C.), a pressure of between about 0.1 and 0.5 psig.

In addition, hotbox output H2-H2O-G is input to splitter 160 and is split into a steam recycle stream RECH2OLP, where LP stands for low pressure, and a net product H2-H2O—N, where N stands for Net (e.g., output for commercial use or storage). Here, net product H2-H2O—N can have a temperature between about 100° C. and 180° C. (e.g., 130° C.), a pressure of between about 0.1 psig and 0.5 psig. Steam recycle stream RECH2OLP can have a temperature of between about 100° C. and 180° C. (e.g., 130° C.), a pressure of between about 0.1 psig and 0.5 psig. Hotbox 150 can further output enriched air at enriched air outlet 123 via enriched air conduit 125 that can have a temperature of between about 120° C. and 300° C., at essentially local atmospheric pressure (e.g., less than 0.5 psig or less than 0.05 psig).

Steam recycle stream RECH2OLP is input to steam recycle blower 170. The resulting recycled steam REC-STM can have a temperature of between about 100° C. and 180° C. (e.g., 140° C., 154° C.), a pressure between about 0.5 and 1.5 psig (e.g., about 1 psig), and is input into hotbox 150 at recycle steam inlet 111. In some embodiments, there can be no recycled hydrogen feed included with the recycled steam.

As can be understood from FIG. 5, incoming steam temperature at steam conduit 110 (e.g., 105° C.) is low compared with a SOEC configuration with internal steam generation. In various configurations, a plurality of recycle loops can be configured to SOEC systems using both internal steam generation and external steam generation. As shown, recycle steam inlet 111 is configured to receive steam from steam conduit 110. Here, the embodiments optionally route the facility supplied steam from steam conduit 110, typically saturated and at a temperature of about 105° C., through the internal steam generation coils, one or more vaporizers, and/or other heating elements, and use the air exhaust heat (e.g., ~280° C.) to further heat (i.e., superheat) the steam supply before the heat is released at enriched air conduit 125 through optional fan or enriched air blower 126.

In some embodiments, a customer (e.g., user, operator, computer thereof) is enabled to control the solid oxide electrolyzer cell (SOEC) system. One or more interfaces provide a custom communications protocol (e.g., via Ethernet, Internet, hard-wired, etc.) to receive and execute customer commands to operate the different states of the SOEC. Accordingly, the embodiments provide support to meet the customer needs for utilizing renewable hydrogen while guaranteeing a safe operation of the SOEC.

For example, the embodiments enable the customer or other third parties to control the SOEC system using parameters such as hydrogen generation, power limitations, and steam available. In some embodiments, a system is provided that is able to go to a safe standby state in case of communication loss. Further, a safe standby state can be defined based on conditions as agreed with the customer.

Additionally, or alternatively, the embodiments provide one or more mechanisms the for customer to operate the SOEC system, provide safety logic to remain within safety limits of the operation, guarantee that hydrogen generation meets the customer needs, by means of enabling hydrogen production ramping. In some instances, the customer can receive advanced notice of upcoming site limitations (e.g., external hydrogen not available, available power schedule, limited communication to power storage, water and input hydrogen storage limitations, etc.). Accordingly, the customer can adjust to such limitations (e.g., adjust hydrogen generation based on hydrogen usage or hydrogen storage limitations at the site).

Figure 6:
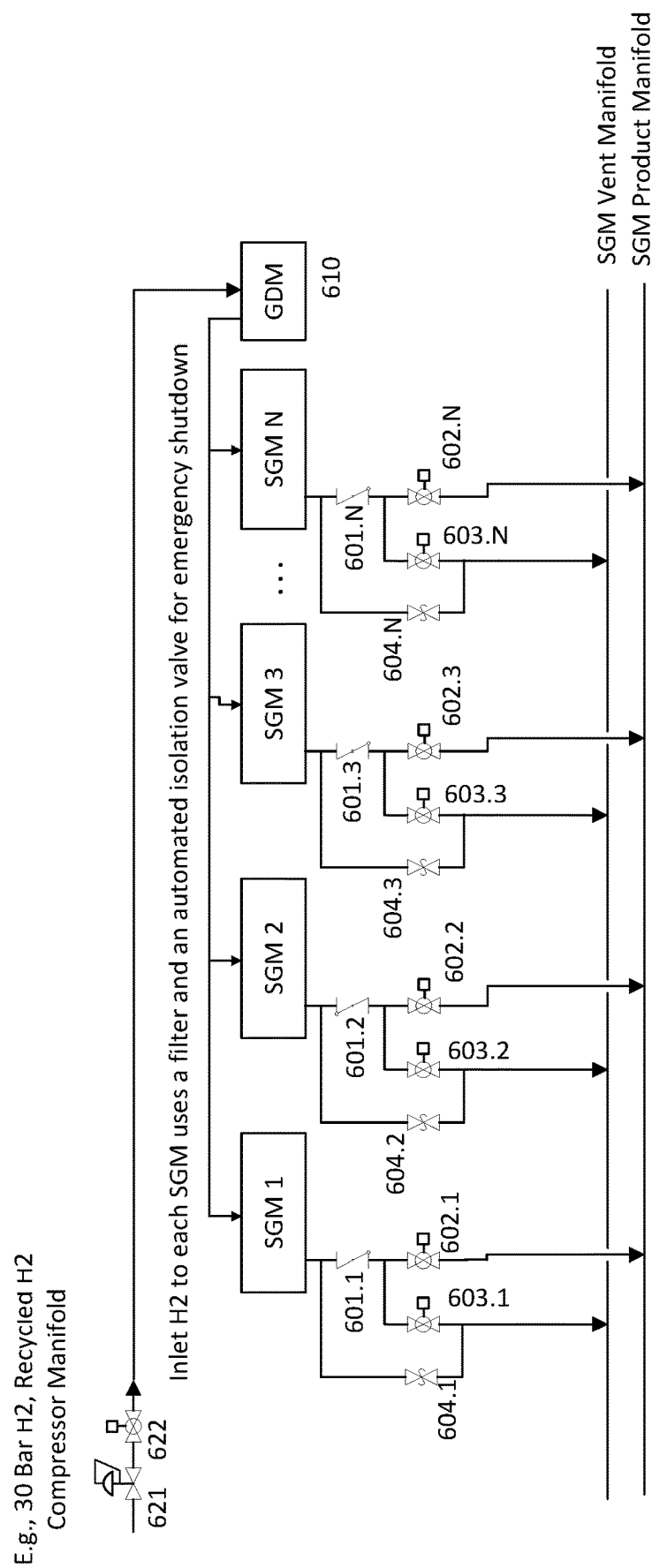
FIG. 6 illustrates a large site electrolyzer system having fault protection according to an example embodiment of the present invention.

FIG. 6 illustrates a large site electrolyzer system 600 having fault protection according to an example embodiment of the present invention.

As illustrated in FIG. 6, system 600 includes a compressor manifold that supplies hydrogen (e.g., 1 Bar, 30 Bar, recycled hydrogen) to gas distribution module 610. Gas distribution module 610 supplies hydrogen to generator modules SGM.1-SGM.N. Each of the generator modules SGM.1-SGM.N supplies product gas to the product manifold during normal operation or to the vent manifold in the event of a fault.

System 600 further includes check valves 601.1-601.N, primary valves 602.1-602.N, secondary valves 603.1-603.N, and relief valves 604.1-604.N. Check valves 601.1-601.N are utilized to prevent backflow from other generator modules connected to the product or vent manifolds. The primary valves 602.1-602.N supply product gas to the product manifold. The secondary valves 603.1-603.N supply product gas/exhaust gas to the vent manifold. The various valves may be fast acting pneumatic ball valves, for example.

During normal operation, each of secondary valves 603.1-603.N is closed and each of primary valves 602.1-602.N is open. However, if there is a fault on any of generator modules SGM.1-SGM.N or if one of the generator modules SGM.1-SGM.N is taken offline, its respective primary valve is closed, and its respective secondary valve is opened. By opening a secondary valve, the product gas is fed to the vent manifold rather than to the product manifold. Accordingly, any type of air intrusion into the product manifold and downstream compressor is prevented.

Relief valves 604.1-604.N are used prevent overpressure. In the event of an overpressure occurrence (e.g., can occur if both primary and secondary valves are closed), excess pressure is released to the vent manifold through a respective relief valve.

In the various embodiments, each of generator modules SGM.1-SGM.N can be a single generator module or a group of generator modules. Individual generator modules SGM.1-SGM.N arranged in a stamp utilize individual control of steam flowrate based on current demand and/or hydrogen production rate for respective generator modules SGM.1-SGM.N. In the event of a fault, such as at the generator module or an upstream/downstream fault, or yet the generator module coming offline for service, the embodiments of the present invention isolate and control the steam supply to the affected generator module.

At a manifold level, the manifold utilizes isolation in the event of a master stamp level control fault or emergency shutdown of the stamp. For example, a pressure regulator 621 and controllable isolation valve 622 (e.g., fast acting pneumatic ball valve) can be used to stop or adjust the flow of hydrogen to gas distribution module 610.

The compressor manifold is continuously pressurized when the stamp is online. The compressor manifold and branch lines to generator modules SGM.1-SGM.N are insulated and heat traced. Having the compressor manifold continuously pressurized and heat traced ensures that high quality steam is available to generator modules SGM.1-SGM.N when they come online and reduces condensation that can arise from cold pipes. In some configurations, a manifold condensate separator can be used to dry the steam from the site. Alternatively, or additionally, drip legs can be placed strategically at the end of the manifold and on vertical branch lines to the generator modules to minimize condensate collection and ensure that dry steam is supplied to the generator modules.

The embodiments enable the entire stamp to remain online even if one or more generator modules are offline, being serviced, or heating up. The embodiments enable or individual control of the generator modules. The embodiments use fast acting ball valves to immediately stop the flow of steam in the event of an upstream or downstream process fault.

In addition, the embodiments of the present invention generally relate to serviceability and maintenance of individual generator modules while allowing online generator modules to continue producing and supplying product hydrogen to a compressor. The embodiments provide protection of the generator modules from downstream pressure surges and faults.

At a stamp level, the product gas from each generator module is manifolded together into to a central line that is fed to a compressor skid. When an individual generator module goes offline or has been repaired and brought back online, there is a risk of air or non-hydrogen purge gas entering the product gas manifold. This will contaminate the product gas stream, bringing the product below customer spec and risk unwanted air-hydrogen mixtures fed to a compressor. The problem being addressed is to enable the other generator modules in the stamp to continue to operate and send gas to the compressor/customer, while the offline generator module is serviced and brought back online. Due to the low operating pressure and sensitivity of the SOEC stacks to rapid pressure spikes, the embodiments also minimize over-pressurization and backflow.

In containerized SOEC or Alkaline/PEM systems, others may stop hydrogen production from the entire module which may be up to 1 MW. This may be acceptable for PEM/Alkaline as cool down and heat up cycles are not required and a module in the container may be exchanged quickly enough to minimize downtime to the customer. However, SOEC systems have a lengthy cool down and heat up cycle and the downtime of the generator modules can be 1-2 days.

To maintain the stamp online while one or more generator modules are offline or heating up, the embodiments introduce a vent manifold within the stamp. At each generator module or group of generator modules, there is a control valve that feeds product gas to the product manifold and a control valve that feeds product/exhaust gas to the vent manifold. From a controls stand point, the vent valve will open and the product gas control valve will close when the generator module is cooling down. The valves stay in this position until the generator module is near an acceptable operating temperature and sufficient time has been allowed to purge all possible air or non-hydrogen purge gas from the hotbox. Prior to the valves switching positions, process flow of steam and hydrogen stops, then the valves switch positions. This prevents a possible surge in pressure while the valves actuate, changing positions. The vent valve can be programmed to open in the event of an over-pressure event further safe-guarding the SOEC stacks.

It will be apparent to those skilled in the art that various modifications and variations can be made in the isolation and serviceability of independent SGM steam lines in an electrolysis stamp of the present invention without departing from the spirit or scope of the invention. Thus, it is intended that the present invention cover the modifications and variations of this invention provided they come within the scope of the appended claims and their equivalents.

What is claimed is:

1. An electrolyzer system, comprising:
a compressor manifold;
a gas distribution module configured to receive hydrogen from the compressor manifold;
generator modules configured to receive the hydrogen from the gas distribution module and to output a product gas, wherein electrolyzer cells are located in the generator modules;
a controller configured to control at least one primary valve to supply the product gas to a product manifold during normal operation of the electrolyzer system, and to supply the product gas to a vent manifold when a fault occurs, wherein the controller is further configured to apply a positive potential to air sides of the electrolyzer cells to operate the electrolyzer cells in an electrolysis mode; and
one or more secondary valves comprising one or more pneumatic ball valves that connect the generator modules to the vent manifold located downstream of the generator modules, wherein the one or more secondary valves are configured to selectively isolate a first one of the generator modules by opening when a fault occurs in the first one of the generator modules to supply the product gas from the isolated first one of the generator modules to the vent manifold, wherein:
in response to the occurrence of the fault in the first one of the generator modules, the controller is configured to close the primary valve of the first one of the generator modules to disconnect the first one of the generator modules from the product manifold without shutting down the electrolyzer system, and the controller is further configured to open the secondary valve of the first one of the generator modules to connect the first one of the generator modules to the vent manifold to vent the product gas to the vent manifold.

2. The electrolyzer system of claim 1, further comprising one or more check valves, one or more primary valves, and one or more relief valves.

3. The electrolyzer system of claim 2, wherein the one or more check valves are configured to prevent backflow from other generator modules connected to the product manifold or vent manifold.

4. The electrolyzer system of claim 2, wherein the one or more primary valves are configured to supply the product gas to the product manifold.

5. The electrolyzer system of claim 2, wherein the system is configured to close a respective secondary valve and to open a respective primary valves during normal operation of a respective generator module.

6. The electrolyzer system of claim 2, wherein the one or more relief valves are configured to prevent an overpressure occurrence.

7. The electrolyzer system of claim 6, wherein the system is configured to release the overpressure the vent manifold.

8. The electrolyzer system of claim 1, wherein the system is configured to open a respective secondary valve and to close a respective primary valve in response to a fault at the respective isolated generator module.

9. The electrolyzer system of claim 8, wherein the system is configured such that the product gas is fed to the vent manifold rather than to the product manifold when the respective secondary valve is open.

10. The electrolyzer system of claim 8, wherein air intrusion into the product manifold and downstream compressor is prevented.

11. The electrolyzer system of claim 1, wherein the fault is a maintenance event.

12. The electrolyzer system of claim 1, wherein the system is configured to transport oxygen ions from a fuel side of the electrolyzer cells to the air side of the electrolyzer cells in the electrolysis mode.

* * * * *